(12) United States Patent
Radle et al.

(10) Patent No.: US 8,573,250 B1
(45) Date of Patent: Nov. 5, 2013

(54) STEAM TRAP WITH INTEGRATED TEMPERATURE SENSORS

(75) Inventors: Bernard J. Radle, Blythewood, SC (US); Robert Leslie Penfield, Columbia, SC (US)

(73) Assignee: Spirax Sarco, Inc., Blythewood, SC (US)

( * ) Notice: Subject to any disclaimer, the term of this patent is extended or adjusted under 35 U.S.C. 154(b) by 855 days.

(21) Appl. No.: 12/552,024

(22) Filed: Sep. 1, 2009

(51) Int. Cl.
- *F16T 1/12* (2006.01)
- *E03B 7/07* (2006.01)
- *G01K 1/14* (2006.01)
- *F16K 37/00* (2006.01)

(52) U.S. Cl.
USPC .......................... 137/552; 137/183; 374/148

(58) Field of Classification Search
USPC ................... 137/551, 552, 183; 374/148, 147
See application file for complete search history.

(56) References Cited

U.S. PATENT DOCUMENTS

| | | |
|---|---|---|
| 2,051,732 A | 8/1936 | McKee |
| 2,379,712 A | 7/1945 | Hildebrecht |
| 2,945,505 A | 7/1960 | Hansen et al. |
| 3,170,477 A | 2/1965 | Scott et al. |
| 3,418,789 A | 12/1968 | Hoffman et al. |
| 3,467,309 A * | 9/1969 | Fujiwara .......................... 236/59 |
| 3,536,090 A | 10/1970 | Scott |
| 3,537,682 A | 11/1970 | Priese |
| 3,559,486 A * | 2/1971 | Gormar .......................... 374/148 |
| 3,583,846 A | 6/1971 | Kimball et al. |
| 3,664,362 A | 5/1972 | Weise |
| 3,664,363 A | 5/1972 | Miyawaki |
| 3,720,223 A | 3/1973 | Goellner |
| 3,807,429 A | 4/1974 | Breton |
| 4,013,220 A | 3/1977 | Zoller |
| 4,161,278 A | 7/1979 | Klann et al. |
| 4,427,149 A | 1/1984 | Adachi |
| 4,630,474 A | 12/1986 | Petroff |
| 4,668,943 A | 5/1987 | Bunker et al. |
| 4,736,886 A | 4/1988 | Oike |
| 4,945,343 A * | 7/1990 | Rodriguez .......................... 340/606 |
| 5,172,332 A | 12/1992 | Hungerford et al. |
| 5,189,877 A | 3/1993 | Wells et al. |
| 5,198,989 A | 3/1993 | Petroff |
| 5,583,492 A | 12/1996 | Nakanishi et al. |

(Continued)

FOREIGN PATENT DOCUMENTS

EP 0211080 A1 2/1987

OTHER PUBLICATIONS

Spirax Sarco, "UTD 42L/LA and UTD 42H/HA Steam Trap and Swivel Connector, Installation and Maintenance Instructions" Aug. 2001.*

(Continued)

*Primary Examiner* — John Rivell
*Assistant Examiner* — Daphne M Barry
(74) *Attorney, Agent, or Firm* — Nelson Mullins Riley & Scarborough, LLP

(57) ABSTRACT

A steam trap comprises a housing defining a flow passage extending between an inlet and an outlet. A cap fitted to the housing has a stop face. In addition, the housing and the cap define a trap chamber. A movable valve element is located in the trap chamber. The steam trap further comprises a first temperature sensor having an inlet sensing portion in the flow path between the inlet and valve element. A second temperature sensor has an outlet sensing portion in the flow path between the valve element and the outlet.

16 Claims, 7 Drawing Sheets

(56) References Cited

U.S. PATENT DOCUMENTS

| | | |
|---|---|---|
| 5,608,171 A | 3/1997 | Hunter et al. |
| 5,633,809 A | 5/1997 | Wissenbach et al. |
| 5,739,420 A | 4/1998 | Peterson |
| 5,918,572 A * | 7/1999 | Suzuki ............... 123/184.57 |
| 5,921,268 A | 7/1999 | Soares |
| 5,934,316 A | 8/1999 | Helmsderfer |
| 5,992,436 A | 11/1999 | Hellman et al. |
| 6,145,529 A | 11/2000 | Hellman et al. |
| 6,155,292 A | 12/2000 | Kurata |
| 6,644,131 B2 * | 11/2003 | Rebik ..................... 73/861.57 |
| 7,316,241 B1 * | 1/2008 | Sharp et al. ................ 137/183 |
| 7,702,484 B2 * | 4/2010 | Armstrong et al. ........... 702/183 |
| 2002/0173923 A1 | 11/2002 | Schutzbach et al. |
| 2006/0118648 A1 * | 6/2006 | Armstrong et al. ......... 236/93 R |

OTHER PUBLICATIONS

Supplemental Information Disclosure Statement regarding U.S. Appl. No. 12/552,024.

Spirax Sarco, Inc., "Thermo-Dynamic Steam Traps," Oct. 2005, 12 pages.

Spirax Sarco, Inc., "Cool Blue TD52 Thermo-Dynamic Series Steam Trap Product Release," Mar. 2005, 16 pages.

* cited by examiner

STEAM TRAP WITH INTEGRATED TEMPERATURE SENSORS

BACKGROUND OF THE INVENTION

The present invention relates generally to steam traps used in steam distribution systems.

Steam traps, which are essentially automatic valves used to discharge condensate, are widely used in steam distribution systems. In operation, flash steam within the trap chamber of such devices functions to keep the valve closed. As the trap cools, the steam condenses and fluid pressure in the inlet passage forces the valve element off its seat. Condensate then passes through the trap, which eventually causes the valve element to again engage the seat.

Attempts have been made to verify the proper operation of steam traps by measuring temperature of incoming and outgoing fluid. In this regard, external piping connections having thermocouple sensors have been attached in line with the inlet and outlet of the thermocouple housing. By analyzing the time-varying pattern of temperature readings, it can be determined on a real-time basis whether the thermocouple is operating properly. Such external connections, however, add to the overall "footprint" of the piping network and may not be possible in situations where space is limited or is otherwise tight.

SUMMARY OF THE INVENTION

In accordance with one aspect, the present invention provides a steam trap comprising a housing defining a flow passage extending between an inlet and an outlet. A cap fitted to the housing has a stop face. In addition, the housing and the cap define a trap chamber. A movable valve element is located in the trap chamber.

The steam trap further comprises a first temperature sensor having an inlet sensing portion in the flow path between the inlet and the valve element. A second temperature sensor has an outlet sensing portion in the flow path between the valve element and the outlet.

In accordance with some exemplary embodiments, the inlet may have a first internally threaded portion and a first smooth bore portion. Similarly, the outlet may have a second internally threaded portion and a second smooth bore portion. First and second sensing ports respectively intersecting the first smooth bore portion and the second smooth bore portion may also be provided.

Preferably, the first and second sensing ports may each have internally threaded portions for engagement by attachment portions of the first and second temperature sensors, respectively. The sensing portions of the temperature sensors may extend axially from the respective attachment portions. It will often be desirable for the temperature sensors to be thermocouples.

Embodiments are contemplated in which an end of the inlet sensing portion of the first temperature sensor is located past a centerline axis of the inlet. An end of the outlet sensing portion of the second temperature sensor may be located substantially at a centerline axis of the outlet.

In some exemplary embodiments, the housing may comprise a unitary trap body. Alternatively, the housing may comprise a body portion and a separate connector portion, the connector portion defining both the inlet and the outlet.

In accordance with another aspect, the present invention provides a steam trap comprising a housing defining a flow passage extending between an inlet and an outlet. A movable valve element is operative to selectively allow flow between the inlet and the outlet. A first sensing port having a first internally threaded portion is located at the inlet of the housing and extends transverse to a flow direction at the inlet. A second sensing port having a second internally threaded portion is located at the outlet and extends transverse to a flow direction at the outlet.

A further aspect of the present invention provides a steam trap comprising a housing comprising a body portion and a separate connector portion together defining a flow passage extending between an inlet and an outlet each located at the connector portion. A movable valve element is operative to selectively allow flow between the inlet and the outlet. A first temperature sensor has an inlet sensing portion in the flow path between the inlet and the valve element. A second temperature sensor has an outlet sensing portion in the flow path between the valve element and the outlet.

Further aspects and features of the present invention are provided by various combinations and subcombinations of the elements disclosed herein.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
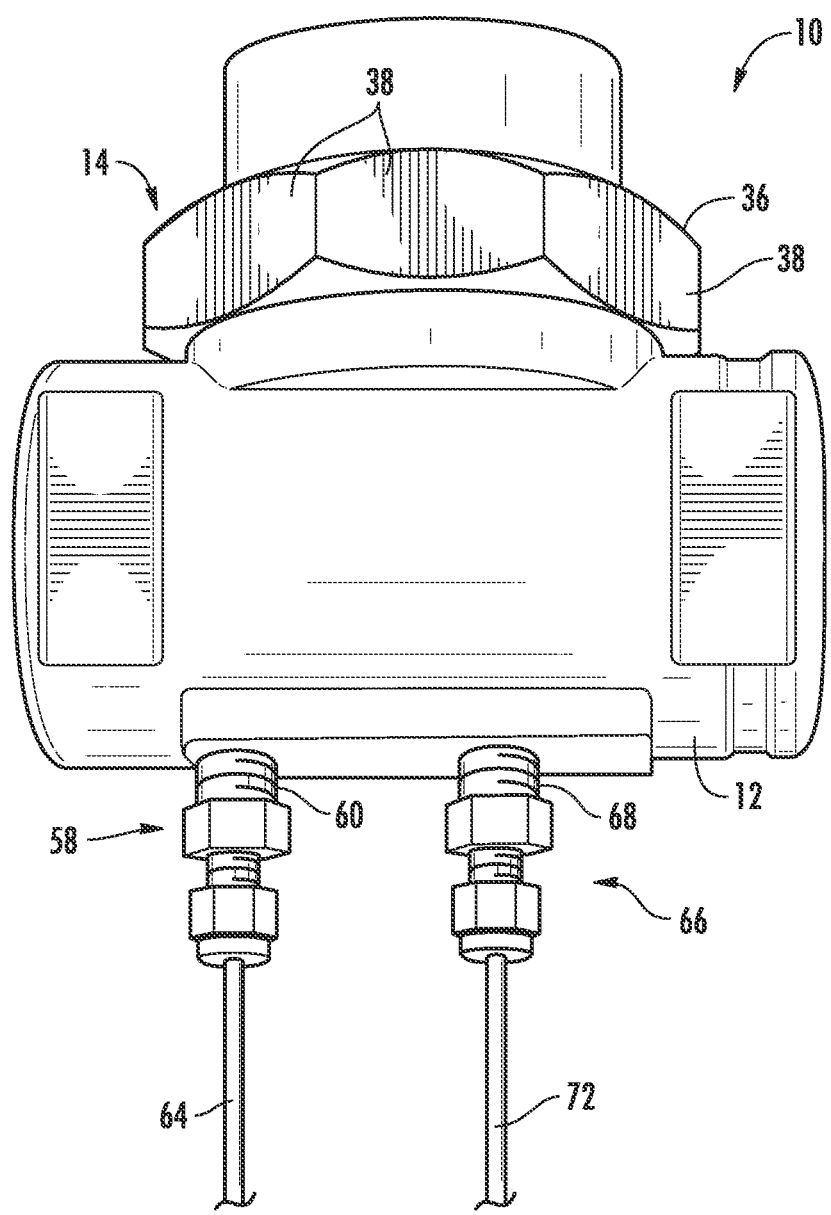
FIG. 1 is a perspective view of a steam trap constructed in accordance with an embodiment of the present invention.

Repeat use of reference characters in the present specification and drawings is intended to represent same or analogous features or elements of the invention.

DETAILED DESCRIPTION OF THE EMBODIMENTS

It is to be understood by one of ordinary skill in the art that the present discussion is a description of exemplary embodiments only and is not intended as limiting the broader aspects of the present invention, such broader aspects being embodied in the exemplary constructions.

Figure 2:
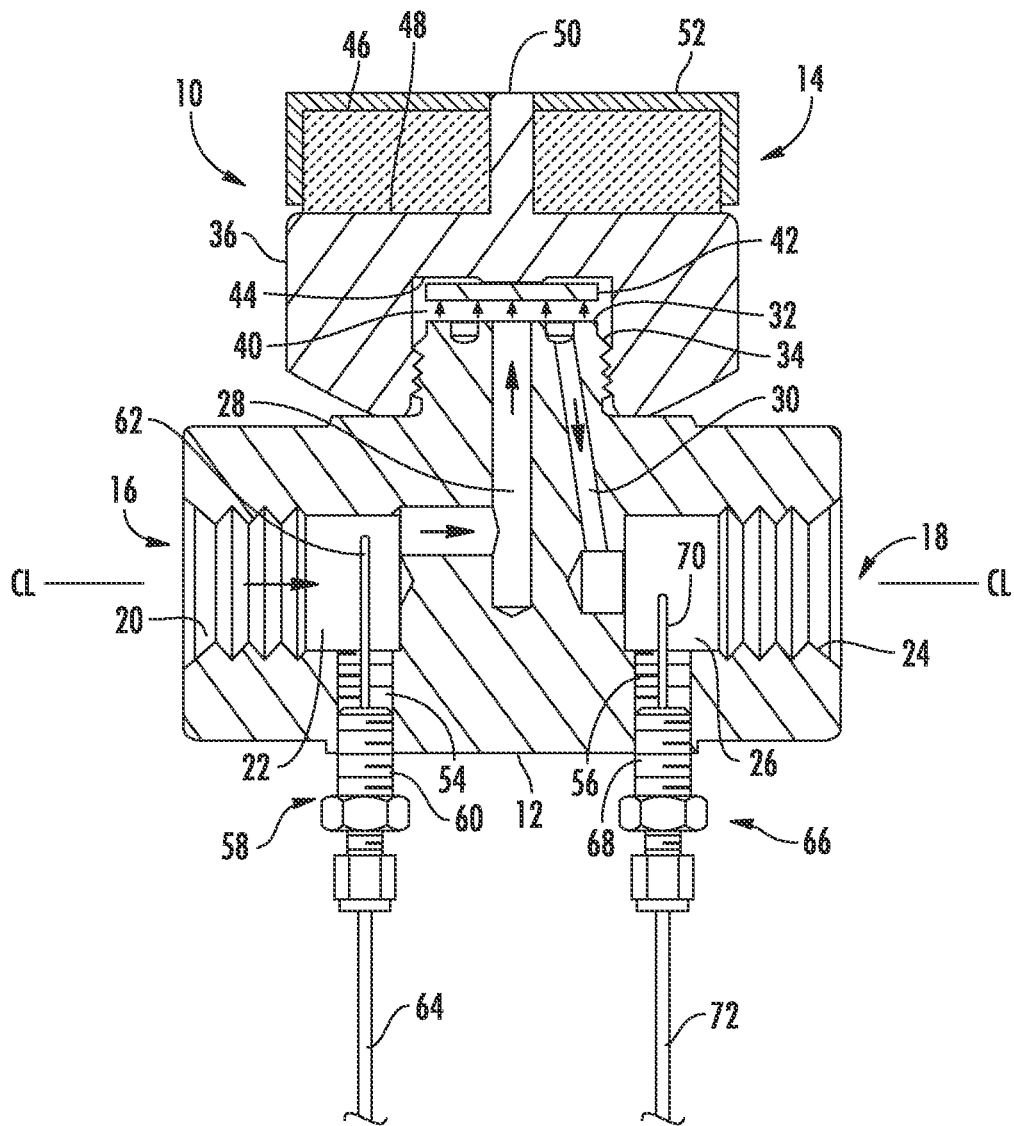
FIG. 2 is cross-sectional view of the steam trap of FIG. 1.

FIG. 1 illustrates an embodiment of a novel steam trap 10 constructed in accordance with the present invention. Steam trap 10 has a trap body 12 to which a cap assembly 14 is attached. Referring now also to FIG. 2, trap body 12 defines an inlet 16 and an outlet 18 through which the condensate flows.

In this embodiment, inlet 16 defines an internally threaded portion 20 upstream of a smooth bore portion 22. As one skilled in the art will appreciate, threaded portion 20 permits connection to a pipeline via threaded coupling. Similarly, outlet 18 has an internally threaded portion 24 downstream of a smooth bore portion 26.

Inlet 16 is in fluid communication with an internal inlet passage 28, whereas outlet 18 is in fluid communication with at least one internal outlet passage 30. Inlet passage 28 and outlet passage 30 emerge at a seating face 32 located at the end of a spigot 34. Cap assembly 14 includes a cap 36 having internal threads engaging outer threads on spigot 34. As can be seen most clearly in FIG. 1, cap 36 preferably defines a series of flats 38 about its periphery for engagement by a wrench.

Along with seating face 32, cap 36 defines a trap chamber 40 in which a valve element in the form of a metal disc 42 is located. Disc 42 is movable upwardly and downwardly within chamber 40, its movement being limited by seating face 32 and an opposed stop face 44 on the interior of cap 36. Typically, body 12 and cap 36 are made from metal such as stainless steel.

In the illustrated embodiment, cap assembly 14 further includes a ceramic disc 46 juxtaposed to the top surface 48 of cap 36 to reduce heat loss that may otherwise occur through the cap. As shown, cap 36 includes a vertical pin 50 which is received in a central bore defined in ceramic disc 46. Preferably, the pin and bore are dimensioned to form a tight fit between these two components. As a result, ceramic disc 46 will be maintained securely in proximity to top surface 48 of cap 36, without rotating. In addition, a cover 52, which may be stamped from thin metal, is fitted over ceramic disc 46 and secured to pin 50 such as by a small spot weld.

In operation, condensate reaches trap 10 at inlet 16. The condensate flows through inlet passage 28, lifting disc 42 off of seating face 32. The condensate continues through outlet passage 30 and leaves trap 10 through outlet 18. As steam approaches the trap, the temperature of the condensate increases.

When the hot condensate passes between disc 42 and seating face 32, a portion of it evaporates and forms flash steam. The resulting expansion causes an increase in volume of the flowing mixture of flash steam and condensate, thus increasing the velocity. This causes a local reduction in pressure between disc 42 and seating face 32, which pushes disc 42 into engagement with seating face 32. A steam bubble within chamber 40 retains disc 42 against seating face 32, thus resisting the pressure in the upstream pipeline. Loss of heat causes the bubble to collapse, resulting in cycling of steam trap 10.

Proper operation of steam trap will thus cause periodic variations in temperature both upstream and downstream of disc 42. As noted above, prior efforts to monitor these temperatures has involved attaching external piping connections in line with the inlet and outlet of the trap body. In addition to increasing the overall footprint of piping near the steam trap, such an arrangement places the sensing elements away from the valve disc. Accordingly, the response detected at this location may not always coincide with the internal steam trap temperature.

The present invention, in contrast, provides a construction wherein the temperature sensing elements are located within the installation "footprint" of the steam trap itself, and closer to the movable disc inside. Referring now particularly to FIG. 2, sensing ports 54 and 56 are associated with inlet 16 and outlet 18, respectively. In particular, port 54 extends through the wall of body 12 so as to intersect smooth bore portion 22 in a direction transverse to the direction of fluid flow. Similarly, port 56 intersects smooth bore portion 26 in a direction transverse to the direction of fluid flow. In this embodiment, both of ports 54 and 56 are internally threaded.

Figure 3:
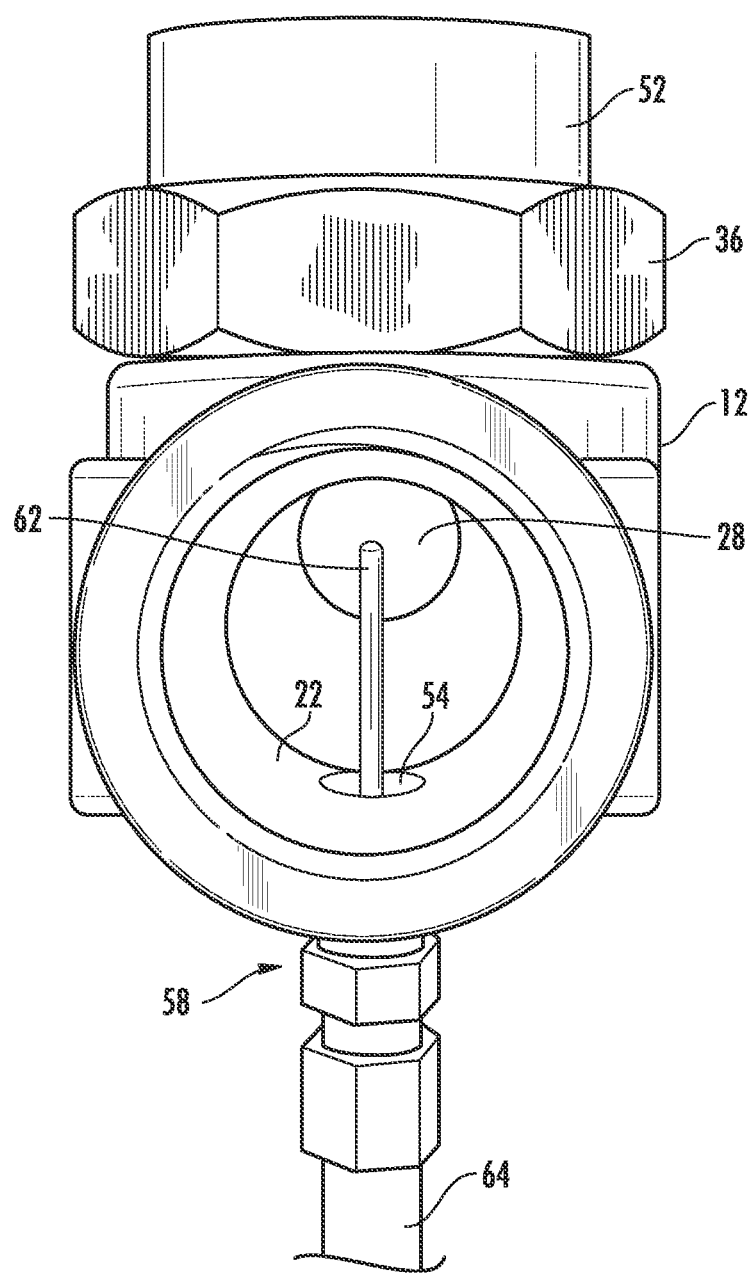
FIG. 3 is an elevational view of the inlet of the steam trap of FIG. 1.

A suitable temperature sensor is inserted through port 54 such that its sensing element will be in the flow path of the incoming fluid. In this embodiment, for example, a thermocouple sensor 58 is received in port 54. Sensor 58 includes an attachment portion 60 having external threads which engage the internal threads of port 54. A sensing portion 62 extends from attachment portion 60 such that its tip will be in the fluid flow path. As can be clearly seen in FIG. 3, the end of sensing portion 62 is, in this case, situated past (and above) the centerline CL of inlet 16 to be in alignment with the opening to inlet passage 28. A lead wire 64 extends away from attachment portion 60 for connection to appropriate monitoring equipment.

Figure 4:
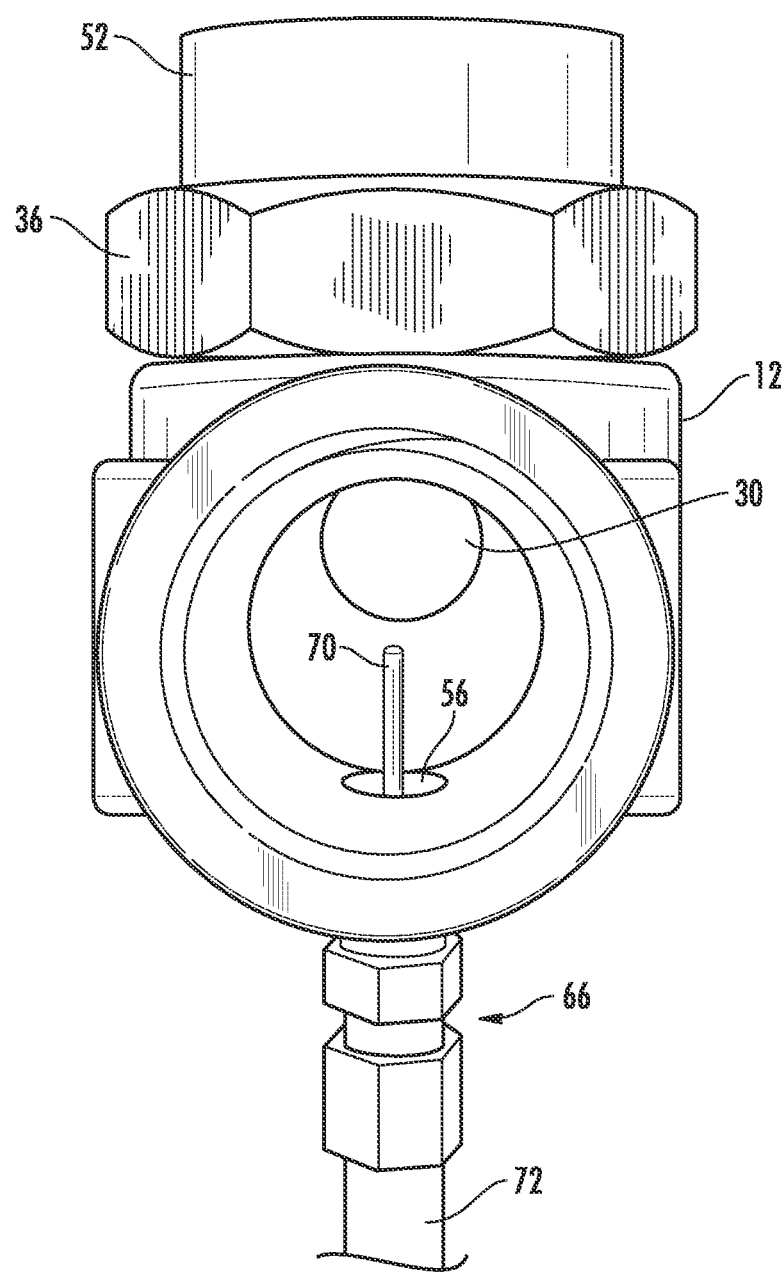
FIG. 4 is an elevational view of the outlet of the steam trap of FIG. 1.

In similar fashion, a suitable temperature sensor is inserted through port 56 such that its sensing element will be in the flow path of the outgoing fluid. For example, the illustrated embodiment provides a thermocouple sensor 66 which is received in port 56. Sensor 66 includes an attachment portion 68 having external threads which engage the internal threads of port 56. A sensing portion 70 extends from attachment portion 68 such that its tip will be in the fluid flow path. As shown in FIG. 4, the end of sensing portion 70 is situated approximately at the centerline CL of outlet 18 in this case. A lead wire 72 extends away from attachment portion 68 for connection to appropriate monitoring equipment.

Figure 5:
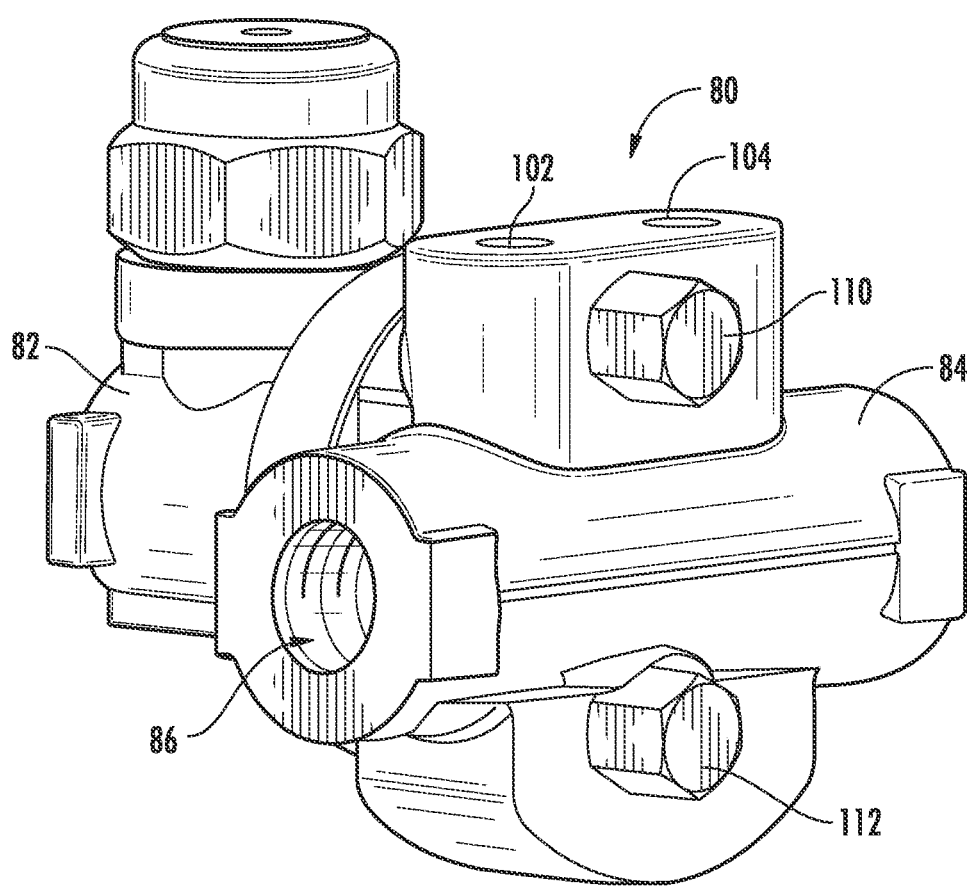
FIG. 5 is a perspective view of an alternative embodiment of a steam trap constructed in accordance with the present invention utilizing a steam trap body portion and a universal connector portion.

FIG. 5 illustrates a steam trap 80 constructed in accordance with an alternative embodiment of the present invention. Steam trap 80 is constructed in two main portions—a steam trap body portion 82 and a universal connector portion 84—that are fixed together. Connector portion 84 (which may also be referred to as a "connector block") permits steam traps of different capacities to be utilized with a single connection envelope in a steam distribution system.

Figure 6:
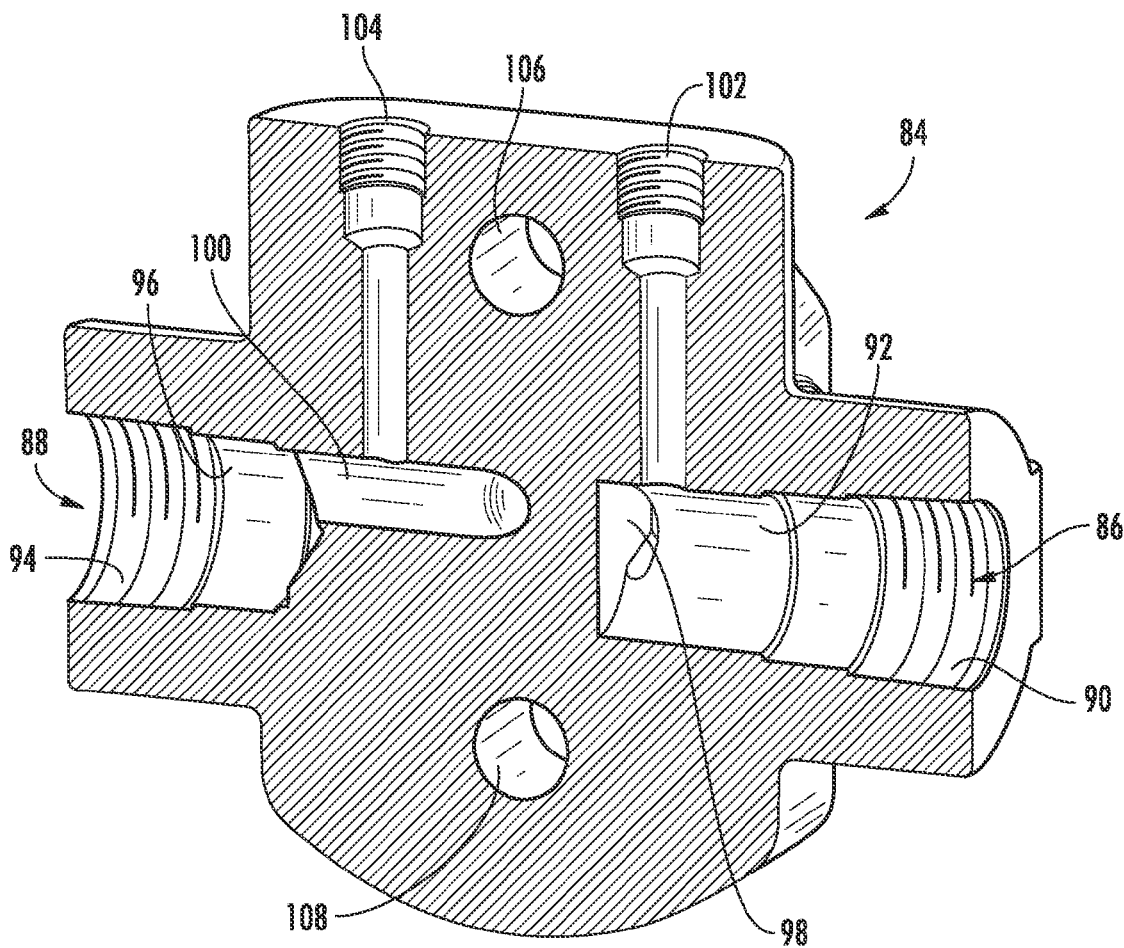
FIG. 6 is a cross-section view of the universal connector portion of the steam trap of FIG. 5.

Referring now to FIG. 6, connector portion 84 defines an inlet 86 and an outlet 88. In this embodiment, inlet 86 defines an internally threaded portion 90 upstream of a smooth bore portion 92. Similarly, outlet 88 has an internally threaded portion 94 downstream of a smooth bore portion 96. Inlet 86 and outlet 88 are in fluid communication with inlet passage 98 and outlet passage 100, respectively.

Sensing ports 102 and 104 are associated with inlet 86 and outlet 88, respectively. In particular, port 104 extends through the wall of block portion 84 so as to intersect outlet passage 100 in a direction transverse to the direction of fluid flow. Similarly, port 102 intersects smooth bore portion 92 in a direction transverse to the direction of fluid flow. As shown, both of ports 102 and 104 may be internally threaded. Suitable temperature sensors, such as those described above in connection with the previous embodiment, are inserted through ports 102 and 104 such that their sensing tips will be at the appropriate location.

Figure 7:
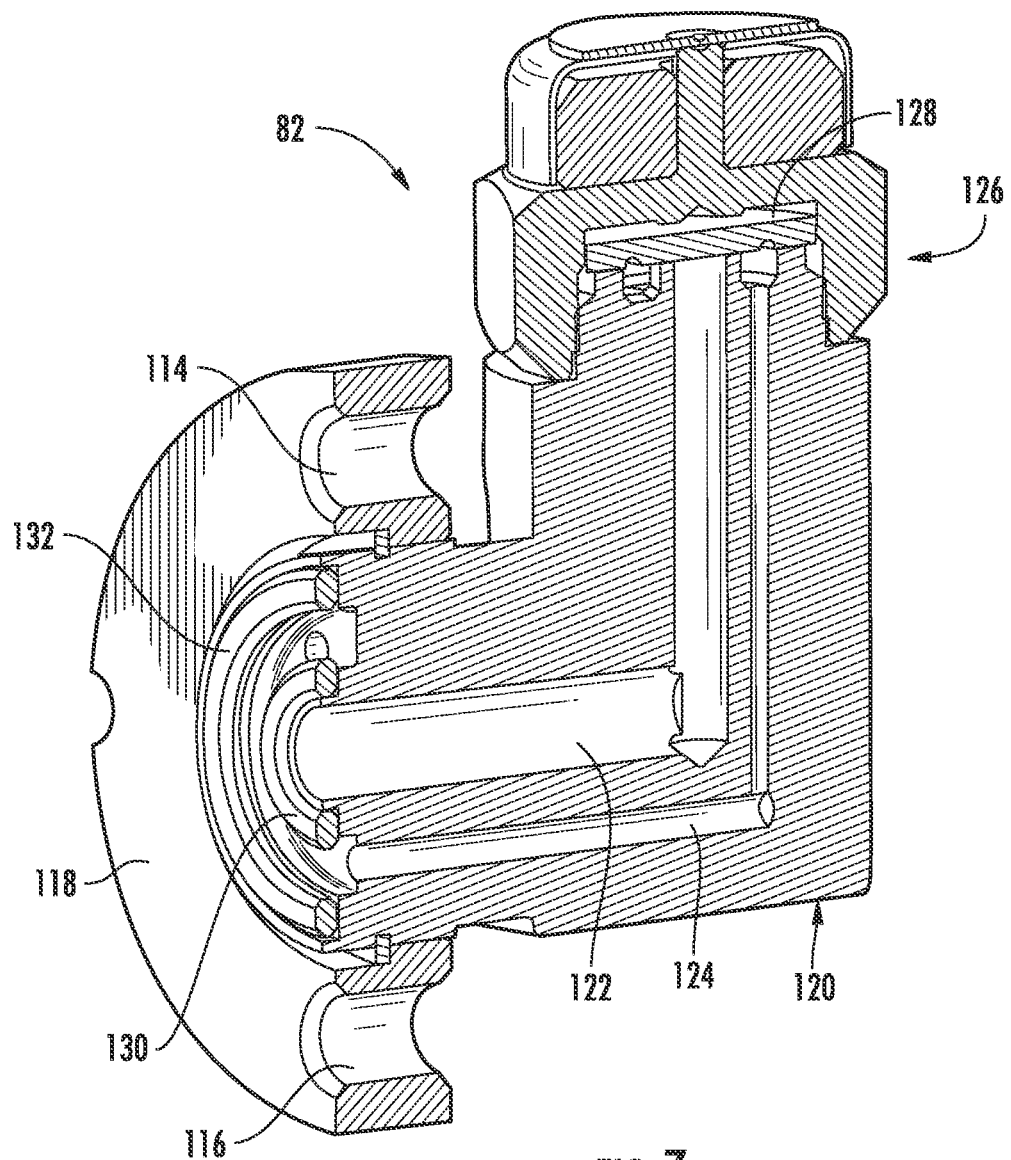
FIG. 7 is a cross-sectional view of the steam trap body portion of the steam trap of FIG. 5.

In the illustrated embodiment, connector portion 84 further includes holes 106 and 108 for receipt of suitable fasteners. Bolts 110 and 112 (FIG. 5) may extend through holes 106 and 108 to threadably engage bores 114 and 116 in body portion 82 (FIG. 7). As a result, body portion 82 and connector portion 84 will be securely connected together.

The construction of body portion 82 may be most easily explained with reference to FIG. 7. As shown, body portion 82 has an attachment flange 118 at which bores 114 and 116 are located. An L-structure 120 defines an inlet passage 122 and at least one outlet passage 124. As one skilled in the art will appreciate, inlet passage 122 is in fluid communication with inlet passage 98 of block portion 84. Similarly, outlet passage 124 is in fluid communication with outlet passage 100.

A cap assembly 126 (similar to cap assembly 14 in its construction) is attached to L-structure 120. A movable disc 128 is located in the space between L-structure 120 and cap 126 to move in and out of engagement with a seating face.

O-rings 130 and 132, or other suitable seals, may be provided to seal the interface between body portion 82 and connector portion 84.

It can thus be seen that the present invention provides a novel steam trap having integrated temperature sensors. While preferred embodiments of the invention have been shown and described, modifications and variations may be made thereto by those of skill in the art without departing from the spirit and scope of the present invention. It should also be understood that aspects of those embodiments may be interchangeable in whole or in part. Furthermore, those of ordinary skill in the art will appreciate that the foregoing description is by way of example only and is not intended to be limitative of the invention described herein.

What is claimed is:

1. A steam trap comprising:
   a housing defining a flow path extending between an inlet and an outlet, said inlet having a first internally threaded portion and a first smooth bore portion;
   a cap fitted to said housing and having a stop face, said housing and said cap defining a trap chamber;
   a movable valve element located in said trap chamber; and
   a first temperature sensor having an attachment portion and an inlet sensing portion, said attachment portion being attached to said housing and said inlet sensing portion extending from said attachment portion past a centerline axis of said inlet so that an end of said inlet sensing portion is past said centerline axis of said inlet and in said flow path between said inlet and said movable valve element; and
   a second temperature sensor having an attachment portion and an outlet sensing portion in said flow path between said movable valve element and said outlet.

2. A steam trap as set forth in claim 1, wherein said outlet has a second internally threaded portion and a second smooth bore portion.

3. A steam trap as set forth in claim 2, wherein said housing defines first and second sensing ports intersecting said first smooth bore portion and said second smooth bore portion, respectively.

4. A steam trap as set forth in claim 3, wherein said first and second sensing ports each have internally threaded portions for engagement by said attachment portions of said first and second temperature sensors, respectively.

5. A steam trap as set forth in claim 4, wherein said sensing portions of said temperature sensors extend axially from said attachment portions.

6. A steam trap as set forth in claim 5, wherein said temperature sensors are thermocouples.

7. A steam trap as set forth in claim 1, wherein said temperature sensors are thermocouples.

8. A steam trap as set forth in claim 1, wherein an end of said outlet sensing portion of said second temperature sensor is located substantially at a centerline axis of said outlet.

9. A steam trap as set forth in claim 1, wherein said housing comprises a unitary trap body.

10. A steam trap as set forth in claim 1, wherein said housing comprises a body portion and a separate connector portion, said connector portion defining both said inlet and said outlet.

11. A steam trap comprising:
    a housing defining a flow path extending between an inlet and an outlet, said inlet having a first internally threaded portion and a first smooth bore portion;
    a movable valve element operative to selectively allow flow between said inlet and said outlet;
    a first sensing port located at said inlet of said housing and extending transverse to a flow direction at said inlet, said first sensing port having a first internally threaded portion;
    a second sensing port located at said outlet of said housing and extending transverse to a flow direction at said outlet, said second sensing port having a second internally threaded portion;
    a first temperature sensor having an engagement portion located in said first sensing port and having an inlet sensing portion extending from said attachment portion past a centerline axis of said inlet so that an end of said inlet sensing portion is past said centerline axis of said inlet and in said flow path; and
    a second temperature sensor having an engagement portion located in said second sensing port and having an outlet sensing portion in said flow path.

12. A steam trap as set forth in claim 11, wherein said temperature sensors are thermocouples.

13. A steam trap as set forth in claim 11, wherein:
    said first sensing port intersects said first smooth bore portion; and
    said outlet has a second internally threaded portion and a second smooth bore portion, said second sensing port intersecting said second smooth bore portion.

14. A steam trap as set forth in claim 11, wherein said housing comprises a unitary trap body.

15. A steam trap comprising:
    a housing comprising a body portion and a separate connector portion together defining a flow path extending between an inlet and an outlet each located at said connector portion, said inlet having a first internally threaded portion and a first smooth bore portion;
    a movable valve element operative to selectively allow flow between said inlet and said outlet;
    a first temperature sensor having an attachment portion and an inlet sensing portion, said attachment portion being attached to said housing and said inlet sensing portion extending from said attachment portion past a centerline axis of said inlet so that an end of said inlet sensing portion is past said centerline axis of said inlet and in said flow path between said inlet and said movable valve element; and
    a second temperature sensor having an attachment portion and an outlet sensing portion in said flow path between said movable valve element and said outlet.

16. A steam trap as set forth in claim 15, wherein said separate connector portion defines first and second sensing ports intersecting said inlet and said outlet, respectively.

* * * * *